(12) United States Patent
Hsu et al.

(10) Patent No.: US 8,906,999 B2
(45) Date of Patent: Dec. 9, 2014

(54) STYRENE-FREE UNSATURATED POLYESTER

(75) Inventors: Chih-Pin Hsu, Parkville, MO (US); Ming Yang Zhao, Kansas City, MO (US); Steven L. Voeks, Smithville, MO (US)

(73) Assignee: CCP Composites US LLC, North Kansas City, MO (US)

( * ) Notice: Subject to any disclaimer, the term of this patent is extended or adjusted under 35 U.S.C. 154(b) by 0 days.

(21) Appl. No.: 13/396,978

(22) Filed: Feb. 15, 2012

(65) Prior Publication Data

US 2012/0214940 A1 Aug. 23, 2012

Related U.S. Application Data

(60) Provisional application No. 61/443,891, filed on Feb. 17, 2011.

(51) Int. Cl.
| | | |
|---|---|---|
| C08K 3/06 | (2006.01) | |
| C08G 63/553 | (2006.01) | |
| C08G 61/08 | (2006.01) | |
| C08L 65/00 | (2006.01) | |
| C08L 67/06 | (2006.01) | |

(52) U.S. Cl.
CPC .............. *C08G 63/553* (2013.01); *C08G 61/08* (2013.01); *C08L 65/00* (2013.01); *C08L 67/06* (2013.01); *C08G 2261/3324* (2013.01); *C08G 2261/418* (2013.01); *G08G 2261/76* (2013.01)
USPC ............................. 524/439; 525/437; 528/272

(58) Field of Classification Search
USPC ............................. 524/439; 525/437; 528/272
See application file for complete search history.

(56) References Cited

U.S. PATENT DOCUMENTS

| | | | |
|---|---|---|---|
| 3,166,434 A * | 1/1965 | Gauger, Jr. ..................... 427/303 | |
| 3,597,403 A * | 8/1971 | Ofstead ......................... 526/137 | |
| 4,072,642 A | 2/1978 | Ritz et al. | |
| 4,360,634 A | 11/1982 | Nelson | |
| 4,426,502 A | 1/1984 | Minchak | |
| 4,469,809 A | 9/1984 | Klosiewicz | |
| 4,703,098 A | 10/1987 | Matlack | |
| 4,835,230 A | 5/1989 | Khasat et al. | |
| 4,923,936 A | 5/1990 | Goodall et al. | |
| 5,143,992 A | 9/1992 | Kelsey | |
| 5,194,534 A | 3/1993 | Bell | |
| 5,268,232 A | 12/1993 | Khasat et al. | |
| 5,296,566 A | 3/1994 | Brown-Wensley et al. | |
| 5,312,940 A | 5/1994 | Grubbs et al. | |
| 5,342,909 A | 8/1994 | Grubbs et al. | |
| 5,728,785 A | 3/1998 | Grubbs et al. | |
| 5,831,108 A | 11/1998 | Grubbs et al. | |
| 5,939,504 A | 8/1999 | Woodson, Jr. et al. | |
| 5,998,326 A | 12/1999 | Hafner et al. | |
| 6,020,433 A | 2/2000 | Hirano et al. | |
| 6,147,026 A | 11/2000 | Setiabudi et al. | |
| 6,204,347 B1 | 3/2001 | Hafner et al. | |
| 6,288,146 B1 | 9/2001 | Blum et al. | |
| 6,310,121 B1 | 10/2001 | Woodson, Jr et al. | |
| 6,437,087 B1 * | 8/2002 | Kulzick et al. ................. 528/272 | |
| 6,525,125 B1 * | 2/2003 | Giardello et al. ............. 524/439 | |
| 7,001,590 B1 * | 2/2006 | Angeletakis ..................... 424/49 | |
| 7,666,966 B2 | 2/2010 | Sugawara | |
| 2009/0306333 A1 | 12/2009 | Jing et al. | |
| 2010/0063200 A1 | 3/2010 | Lu et al. | |

FOREIGN PATENT DOCUMENTS

| | | |
|---|---|---|
| EP | 1491570 | 12/2004 |
| GB | 2014170 | 8/1979 |
| JP | 63092625 | 4/1988 |
| JP | 63235324 | 9/1988 |
| JP | 64056723 | 3/1989 |
| RU | 2402572 | 10/2010 |
| WO | 9732913 | 9/1997 |
| WO | 2012110648 | 8/2012 |

OTHER PUBLICATIONS

Bielawski, et al., Prog. Polym. Sci. 32 (2007) 1-29.*
Bielawski, C.W, "Living ring-opening metathesis polymerization", Prog. Polm. Sci. 32 (2007) 1-29.
Draoegutaan, V., "Advances in Cycloole n Polymerization", http://www.crcetbase.com/doi/abs/10.1201/9780203908716.ch4. (2012) 1-49.
"Ring opening metathesis polymerisation", http://en.wikipedia.org/wiki/Ring_opening_metathesis_polymerization (2011) 1-3.
"Ring-opening polymerization", http://en.wkipedia.org/wiki/Ring-opening_polymerization (2011) 1-2.
International Search Report for PCT App. No. PCT/EP2012/052803 mailed on May 10, 2012.

* cited by examiner

*Primary Examiner* — Hannah Pak
(74) *Attorney, Agent, or Firm* — Whyte Hirschboeck Dudek S.C.

(57) ABSTRACT

A thermosetting unsaturated polyester resin (UPR) composition comprising an unsaturated polyester polymer having at least two strained cycloolefinic double bonds and optional unstrained cycloolefinic double bonds, which can be cross-linked through a ring-opening metathesis polymerization (ROMP) or combination of ROMP and cationic or free radical polymerization is provided. No styrene is used in the resin composition. The thermosetting unsaturated polyester resin composition also comprises a catalyst system for the ring-opening metathesis polymerization, and in embodiments, can further comprise one or more optional unsubstituted or substituted cycloolefin monomer containing unsaturation, an optional co-catalyst selected from a cationic initiator or free radical initiator, and optional additives. The cured resin properties can be controlled through adjusting the structure and properties of the unsaturated polyester resin.

12 Claims, No Drawings

US 8,906,999 B2

STYRENE-FREE UNSATURATED POLYESTER

CROSS REFERENCE TO RELATED APPLICATION

This application claims the benefit of U.S. Provisional Application Ser. No. 61/443,891 filed Feb. 17, 2011, and is incorporated herein by reference.

FIELD OF THE INVENTION

The present invention relates to a thermosetting resin composition comprising an unsaturated polyester polymer having at least two strained cycloolefinic double bonds, which can be cross-linked through a ring-opening metathesis polymerization (ROMP) or combination of ROMP and cationic or free radical polymerization. In embodiments, the unsaturated polyester resin composition can be dissolved in an unsubstituted or substituted cycloolefin monomer containing unsaturation. No styrene monomer is used in this thermoset resin system, and the cured resin properties can be controlled through adjusting the properties of the unsaturated polyester polymer.

BACKGROUND OF THE INVENTION

The manufacture of unsaturated polyester resins (UPR) is well known in the art. Unsaturated polyester resins are obtained by the condensation reaction of one or more of a saturated di- or polycarboxylic acid or anhydride and an unsaturated di- or polycarboxylic acid or anhydride with a glycol and/or a polyhydric alcohol. The unsaturated polyester resin can also be prepared from unsaturated di- or polycarboxylic acid(s) or anhydride(s) with glycols and/or polyhydric alcohol(s). The traditional known unsaturated polyester resin solution also contains ethylenically unsaturated monomer. The ethylenically unsaturated monomer can be any ethylenically unsaturated monomer capable of crosslinking the unsaturated polyester resin via vinyl addition polymerization. Examples of useful ethylenically unsaturated monomers are styrene, o-, m-, p-methyl styrene, methyl acrylate, methyl methacrylate, t-butylstyrene, divinyl benzene, diallyl phthalate, triallyl cyanurate and mixtures of two or more unsaturated monomers. The preferred monomer is styrene because it provides an economical monomer solution. Conventional unsaturated polyester resin usually contains 35 to 45 wt % of styrene and other volatile organic compounds (VOC).

The presence of large amounts of styrene in such resin compositions results in the emission of styrene vapors into the work atmosphere which constitutes a hazard to the environment. In view of this environmental hazard, governments have established regulations setting forth guidelines relating to volatile organic compounds which may be released to the atmosphere. The U.S. Environmental Protection Agency (EPA) has established guidelines limiting the amount of styrene released to the atmosphere, such guidelines being scheduled for adoption or having been adopted by various states of the United States. Guidelines relating to styrene, such as those of the EPA, and environmental concerns are particularly pertinent to the composite industry which uses styrene that is emitted into the atmosphere.

To reduce styrene and VOC content in unsaturated polyester resins, researchers have tried to develop low VOC resin compositions in which the VOC in the resin is kept at the lowest possible level. One way to reduce VOC is to reduce the molecular weight of the resin. According to polymer physics theory, the viscosity of polymers in the liquid state depends mainly on the average molecular weight, so it is desirable to reduce average molecular weight for a low VOC product. Low molecular weight leads to a lower viscosity and lower styrene need. Compared with conventional resin, which has higher molecular weight and higher styrene content, the low VOC resin typically contains 35% or less styrene and VOC content. The lower molecular weight resin has the advantage of reduced VOC, but it also has disadvantages over the conventional resin. The lower molecular weight resin tends to have poor properties such as low mechanical properties and high hydrolysis in applications compared to the conventional resin.

The production of thermoset polymers by ring-opening metathesis polymerization (ROMP) of cycloolefins is well known in the art. Many US and foreign patents and literature references relate to the ROMP of dicyclopentadiene (DCPD) in the presence of a variety of olefin metathesis catalyst systems. The earlier ROMP process involved the use of a multiple-component catalyst system. The ROMP catalyst and activator were dissolved in different reactant streams, and the various reactant streams were combined to form thermoset polymers during the molding process. U.S. Pat. No. 4,426,502 describes a tungsten or molybdenum compound catalyst and an alkoxyalkylaluminum halide or aryloxyalkylaluminum halide co-catalyst to polymerize the cyclic olefins by a reaction injection molding (RIM) process at an elevated temperature in a period of less than about 2 minutes. U.S. Pat. No. 4,469,809 describes a two-part metathesis catalyst system containing $WOCl_4$, $WCl_6$ or a combination of $WCl_6$ plus an alcohol or phenol as the metathesis catalyst. A second part of the catalyst system is comprised of an activator such as $SnBu_4$, $AlEt_3$, $AlEt_2Cl$, $AlEtCl_2$, or similar compounds. The activator also contained a solution including an ester, ether, ketone or nitrile, which serves to moderate the rate of polymerization. U.S. Pat. No. 4,923,936 describes a catalyst and co-catalyst system containing organoammonium, organophosphonium, and organoarsonium heteropolymolybdates and heteropolytungstates as catalyst and alkylaluminum, alkylaluminum halides, alkoxyalkylaluminum halides, aryloxyalkylaluminum halides as the co-catalyst. U.S. Pat. No. 5,194,534 describes a two-component ROMP catalyst system containing a pure tungsten-imido compound and an activator compound selected from organometals and organometal hydrides.

However, in the reaction using a multiple-component ROMP catalyst, the monomer must be highly purified, and catalyst poisons such as water and alcohols must be avoided. U.S. Pat. No. 5,296,566 describes a one-component transition metal-containing catalyst system which is air and moisture stable. The one-component catalyst is a cationic organometallic ruthenium and osmium-containing salt having at least one polyene ligand. U.S. Pat. Nos. 5,312,940, 5,342,909, and 5,831,108 disclose a ruthenium or osmium carbene complex catalyst useful as a one-component catalyst in ROMP, which is particularly useful in the living polymerization of strained and unstrained cyclic olefins. This type of ROMP catalyst is stable in the presence of various functional groups and is less sensitive to the catalyst poisons present in the lower purity monomer. U.S. Pat. No. 6,020,433 describes using the ruthenium or osmium carbene complex catalyst to make poly DCPD from lower grade DCPD (contains 81-86% DCPD monomer) starting materials. The lower grade DCPD may contain the impurity of various functional groups including hydroxyl, thiol, ketone, aldehyde, ester, ether, amine, imine, amide, nitro, carboxylic acid, disulfide, carbonate, isocyanate, carbodiimide, carboalkoxy, and halogen. The activity of one-component ROMP catalyst can also be improved by adding a second component. U.S. Pat. No. 6,147,026 shows that the addition of hydroxyl group-containing 1-alkynes increases the catalytic activity of the ruthenium and osmium phosphines very substantially and improves the properties of the polymers considerably.

The ROMP catalyst system may also include other type initiators to improve the properties of the thermoset polymer. U.S. Pat. No. 4,835,230 describes a multi-component ROMP catalyst system including a metathesis catalyst, an activator of the metathesis catalyst, a moderator, and a cationic polymerization initiator. The thermoset dicyclopentadiene polymers and copolymers made with this multi-component ROMP catalyst system have higher Tg and HDT and lower residual monomer content. U.S. Pat. No. 5,268,232 describes a molded article comprising the ROMP reaction product of a mixture DCPD monomer and norbornene group containing cycloolefins in the presence of a metathesis catalyst and a co-catalyst that is capable of crosslinking the unsaturated double bonds. U.S. Pat. No. 5,728,785 includes a one-component ruthenium or osmium carbene complex ROMP catalyst in the presence of a modifier or cross-linking agent. Polymer with very high cross-linking density can be produced with the catalyst system. A lower purity cycloolefin monomer (e.g., 85-95% dicyclopentadiene (DCPD)) can also be polymerized to form a highly crosslinked material. U.S. Pat. No. 6,204,347 uses a ROMP catalyst of ruthenium compound and a tertiary phosphine containing at least one secondary alkyl radical or cycloalkyl radical bond to the phosphorous atom to cure a strained cycloolefin.

A wide range of unsubstituted and substituted cycloolefins have been employed as monomers in the ROMP. These unsubstituted and substituted cycloolefins include mono-cyclic olefins, bicyclic olefins, polycyclic olefins and heterocyclic monomers. The substituents are primarily a hydrocarbon group such as alkyl, cycloalkyl or aryl radicals. Functional groups are also possible as substituents in cycloolefins. The heterocyclic monomers contain oxygen, silicon or nitrogen in the ring structure. The heterocyclic monomers serve a special interest in ROMP because they bring chemical bonds (i.e., oxygen, silicon and/or nitrogen) other than the carbon into the polymer chain structure.

Both strained and unstrained cycloolefins can be used in making thermoset polymer depended on the ROMP catalyst system and the reaction conditions. The bicyclic olefin, polycyclic olefin and heterocyclic monomer may have a strained cycloolefin structure. The strained cycloolefins used in the ROMP reaction typically are Diels-Alder adducts of cyclopentadiene.

Suitable Diels-Alder adducts have the formula I:

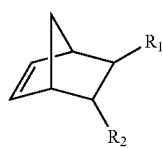

(I)

Where $R_1$ and $R_2$, each independently of the other, are hydrogen, $C_1$-$C_{12}$ alkyl, $C_1$-$C_{12}$ alkene phenyl, tolyl, cyclohexyl, cyclohexenyl, halogen, cyano, $C_1$-$C_{12}$ hydroxyakyl or $C_1$-$C_{12}$ haloalkyl, or $R_1$ and $R_2$ together with the linkage carbon atoms are a five- or six-membered ring.

The most common Diels-Alder adducts of cyclopentadiene are: dicyclopentadiene (DCPD), norbornene, norbornadiene, cyclohexenyinorbornene, tetracyclododecene, 5-ethylidene-2-norbornene (ENB) and methyltetracyclododecene. Polycyclic olefins are made by further reacting the strained cycloolefins with cyclopentadiene through Diels-Alder reaction. The thermoset polymer can be formed by ROMP reaction when the monomer mixture of cycloolefins contains bicyclic or polycyclic olefin with multiple unsaturations. DCPD in particular is commonly used as the monomer to make thermoset polymers in a reaction injection molding (RIM) process. The DCPD monomer mixture may also contain other cyclic unsaturated compounds as a way to modify the properties of the thermoset polymer. Other types of cycloolefins contain multiple unsaturation including cyclopentadiene trimer, tetramer and higher oligomers. U.S. Pat. No. 4,703,098 describes a crosslinked copolymer comprising about 40 to 95% by weight DCPD and about 60 to 5% by weight of higher cyclopentadiene oligomers.

Another approach to make cycloolefin monomers useful for making thermoset polymers is by adding multiple strained and unstrained cycloolefins onto a molecule. Japanese Patent No. 63-092625 discloses a monomer from the Diels-Alder reaction of a 1:1 molar ratio of 3a, 4, 7, 7a-tetrahydroindene with cyclopentadiene. The monomer is useful in the ROMP reaction to produce cross-linked polymer. Japanese Patent No. 63-235324 discloses a molding product with excellent heat resistance and chemical resistance by a ROMP reaction of an ester norbornene derivative with an optional cycloalkene. The optional cycloalkene in the monomer mixture is at most 50 mol %. The ester norbornene derivative is a Diels-Alder reaction product of ester with 1 to 4 carboxylate ester groups and 1 to 4 carbon-carbon double bonds with cyclopentadiene. The ester norbornene derivative contains 1 to 4 norbornene groups from the Diels-Alder reaction without any residual carbon-carbon double bonds. Japanese Patent No. 64-56723 discloses a crosslinked polymer molded product from the ROMP reaction of a monomer mixture containing a metathesis polymerizable cyclic compound and esters from the norbornene ring-containing carboxylic acid and norbornene ring-containing alcohol.

U.S. Pat. No. 5,143,992 describes cyclopentadiene adducts of a cyclic hydrocarbon compound of up to 20 carbon atoms containing two vinyl groups as substituents on carbon atoms at least one carbon atom apart on an aliphatic ring system of from 5 to 10 carbon atoms and of 1 ring or 2 fused rings. WO 97/32913 describes a solvent free polymerizable composition comprising a Diels-Alder adduct of unsubstituted or substituted cycloolefins and unsubstituted or substituted 1, 3-cyclopentadienes having a low content of residual unsubstituted or substituted 1,3-cyclopentadienes. The molding product made with the solvent-free polymerizable composition by ROMP reaction was claimed to have good mechanical (physical) properties.

The thermoset molding composition may contain fibers, filler, reinforcing agents or other additives to adjust or enhance the molding properties. U.S. Pat. Nos. 5,939,504 and 6,310,121 describe the inclusion of an electron donor or Lewis base in the resin composition to change the rate of cycloolefin metathesis catalyzed by ruthenium or osmium carbene complex catalyst. U.S. Pat. No. 7,666,966 includes a chain transfer agent represented by the formula $CH_2=CH$-Q, wherein Q is a group which has at least one group selected from the group consisting of a methacrylol group, acrylol group, vinyl silyl group, epoxy group and amino group. The chain transfer agent is used to control the degree of polymerization in the making of a post-linkable thermoplastic resin. The post-linkable thermoplastic resin can be cross-linked at an elevated temperature at later processing stage.

SUMMARY OF THE INVENTION

It is therefore desirable to provide new, cross-linkable unsaturated polyester resin (UPR) compositions which can be cured with improved physical and chemical properties and have zero styrene monomer at the same time. The approach used to achieve these goals is making the UPR composition cross-linkable through the ring-opening metathesis polymerization (ROMP) or combination of ROMP and cationic or free radical polymerization. The UPR may be blended with an unsubstituted or substituted cycloolefin monomer in place of styrene in the resin composition. The cured compositions have improved physical/mechanical properties such as tensile, flexural, and Izod impact strength and improved chemical properties such as hydrolysis resistance compared to traditional unsaturated polyester resin.

The present invention relates to a thermosetting unsaturated polyester resin (UPR) composition comprising an unsaturated polyester polymer having at least two strained cycloolefinic double bonds and optional unstrained cycloolefinic double bonds, which can be cross-linked through a ring-opening metathesis polymerization (ROMP) reaction or combination of ROMP and cationic or free radical polymerization. The thermosetting unsaturated polyester resin composition also comprises a catalyst system for the ring-opening metathesis polymerization, optionally at least one unsubstituted or substituted cycloolefin monomer containing unsaturation, optionally a co-catalyst selected from a cationic initiator or free radical initiator, and optional additives. The thermosetting unsaturated polyester resin composition can be cured at a temperature range of about 20-200° C. The physical and chemical properties of the cured resin compositions can be controlled by adjusting the structure and properties of the unsaturated polyester resin through combination of various saturated di- or polycarboxylic acids or anhydrides, unsaturated di- or polycarboxylic acids or anhydrides, and glycols or a polyhydric alcohols during the synthesis of unsaturated polyester resin.

DETAILED DESCRIPTION OF THE INVENTION

The styrene-free thermosetting unsaturated polyester resin (UPR) composition presented in this invention comprises an unsaturated polyester polymer having at least two strained cycloolefinic double bonds and optional unstrained cycloolefinic double bonds. The styrene-free thermosetting UPR is cross-linked through ring-opening metathesis polymerization (ROMP) reaction or combination of ROMP and cationic or free radical polymerization.

In embodiments, the unsaturated polyester polymer containing at least two strained cycloolefinic double bonds has a weight average molecular weight of at least about 1000 and a polydispersity greater than or equal to about 2. In some embodiments, the unsaturated polyester polymer containing at least two strained cycloolefinic double bonds contains non-cycloolefinic carbon-carbon double bonds.

The unsaturated polyester polymer containing the strained cycloolefinic double bonds can be prepared through several different methods. In one embodiment, the unsaturated polyester polymer containing at least two strained cycloolefinic double bonds is the reaction product of an unsaturated polyester polymer containing at least two carbon-carbon double bonds and a cyclohydrocarbon compound of up to 10 carbon atoms containing at least two carbon-carbon double bonds. For example, one method of making the unsaturated polyester polymer containing strained cycloolefinic double bonds is through a Diels-Alder reaction of the carbon-carbon double bonds on the polymer chain of an unsaturated polyester polymer (without cycloolefinic double bonds) with a cyclohydrocarbon compound, such as is cyclopentadiene, methyl cyclopentadiene, ethyl cyclopentadiene, isopropyl cyclopentadiene, or mixtures thereof. At least on the average of two carbon-carbon double bonds are present in the unsaturated polyester polymer before the reaction with the cyclohydrocarbon compound. The Diels-Alder reaction of the carbon-carbon double bonds and cyclohydrocarbon compound can occur at any point of the reaction by controlling the reaction temperature, and the addition of a cyclohydrocarbon compound during the reaction. A preferable way of making the unsaturated polyester polymer containing strained cycloolefinic double bonds is by adding dicyclopentadiene into the reactor at or near the end of the synthesis of the unsaturated polyester resin at above its decomposition temperature (150° C.). The dicyclopentadiene decomposes into cyclopentadiene at a temperature above 150° C., and the cyclopentadiene then reacts with the carbon-carbon double bonds of the unsaturated polyester polymer.

The unsaturated polyester polymer without the cycloolefinic double bonds has at least one dicarboxylic alkene moiety and is preferably an oligomer of an $\alpha,\beta$-ethylenically unsaturated dicarboxylic acid compound obtained by the condensation reaction of one or more of a saturated di- or polycarboxylic acid or anhydride and an unsaturated di- or polycarboxylic acid or anhydride with a glycol or a polyhydric alcohol. Examples of suitable saturated di- or polycarboxylic acids include isophthalic, orthophthalic, terephthalic, adipic, succinic, sebacic acid and mixtures of two or more of these compounds, with isophthalic acid being preferred. Typical unsaturated carboxylic acids or anhydrides include maleic acid, fumaric acid, citraconic acid, chloromaleic acid, allyl succinic acid, itaconic acid, mesaconic acid, their anhydrides or substituted anhydrides, and mixtures of two or more such compounds, with maleic anhydride being the preferred choice. Examples of polyhydric alcohols which are useful in the invention include neopentyl glycol, ethylene glycol, diethylene glycol, triethylene glycol, propylene glycol, dipropylene glycol, trimethylolethane, trimethylolpropane (TMP), trimethylpentanediol, 1,4-butanediol, polyethylene glycols, glycerol, mannitol, 1,2-propanediol, pentaerythritol, 1,6-hexanediol, 1,3-butylene glycol and mixtures of two or more of such compounds. The production of such resins is well-known to those skilled in the art and, additionally, many suitable resins are commercially available from resin manufacturers, such as Cook Composites & Polymers Company.

In some embodiments, dicyclopentadiene (DCPD), a cycloolefin monomer containing a strained double bond, can be included as part of the ingredients in making the unsaturated polyester polymer, for example, as described in Example 1, to provide unstrained cycloolefinic double bonds. The dicyclopentadiene-containing unsaturated polyester polymer can be prepared by reacting DCPD with an $\alpha,\beta$-ethylenically unsaturated dicarboxylic acid, a saturated polycarboxylic acid or mixture thereof to form a half ester. The half ester can then be further reacted with an additional saturated di- or polycarboxylic acid or anhydride and/or an unsaturated di- or polycarboxylic acid or anhydride, and a glycol or a polyhydric alcohol. The dicyclopentadiene-containing unsaturated polyester polymer contains the cycloolefinic double bond from the carboxylic-DCPD half ester. However, the cycloolefinic double bond is not located in the strained ring. It is necessary to add the strained cycloolefinic double bond onto the polymer chain for better reactivity of the ROMP reaction, for example, through the reaction of the carbon-carbon double bond of the unsaturated polyester polymer with a cyclohydrocarbon compound containing at least two carbon-carbon double bonds. Thus, in some embodiments, the unsaturated polyester polymer containing at least two strained cycloolefinic double bonds can further contain unstrained cycloolefinic double bonds. The production of such dicyclopentadiene-containing unsaturated polyester polymers is well-known to those skilled in the art and, additionally, many suitable resins are commercially available from resin manufacturers, such as Cook Composites & Polymers Company.

In another embodiment, the unsaturated polyester polymer containing at least two strained cycloolefinic double bonds is the reaction product of a norbornene compound containing functional groups or linkages such as alcohols, carboxylic acids, esters, anhydrides, and the like, with a glycol or a polyhydric alcohol and a saturated di- or polycarboxylic acid or anhydride and an unsaturated di- or polycarboxylic acid or anhydride in the synthesis of the unsaturated polyester polymer. The norbornene functional groups react with the acid or hydroxyl groups of the glycol or acid component and form an ester linkage. Examples of the suitable norbornenes containing functional groups include 5-norbornene-2-carboxylic acid, 5-norbornene-2,3-dicarboxylic acid, diethyl 5-norbornene-2,3-dicarboxylate, dimethyl 5-norbornene-2,3-dicarboxylate, 5-norbornene-2,3-dicarboxylic anhydride, 5-norbornene-2,2-dimethanol, 5-norbornene-2,3-dimethanol, 5-norbornene-2-methanol, 5-norbornen-2-ol, and 5-norbornen-2-yl acetate. The normal skill in the manufacture of unsaturated polyester resins with dicarboxylic acid and glycol as starting ingredients is applied to make the unsaturated polyester polymer containing at least two strained cycloolefinic double bonds.

In another embodiment, the unsaturated polyester polymer containing at least two strained cycloolefinic double bonds is the reaction product of nadic anhydride or substituted nadic anhydride (containing strained cycloolefinic double bonds) with a glycol or polyhydric alcohol and another saturated or unsaturated di- or polycarboxylic acid or anhydride.

Cycloolefin Monomers (Cyclic Olefins).

In embodiments, the unsaturated polyester resin containing at least two cycloolefinic double bonds can optionally be blended with (e.g., dissolved in) an unsubstituted or substituted, cycloolefin monomer (also called cyclic olefins) in place of styrene to reduce viscosity of the resin composition, for example, as described in Examples 5-8. The cycloolefin monomer contains carbon-carbon double bonds.

Cyclic olefins useful in compositions of the present invention preferably include ring-strained monocyclic olefins such as cyclobutene, cyclopentene, cycloheptene, and cyclooctene, optionally substituted with up to four saturated or unsaturated hydrocarbyl, alkaryl, aralkyl or aryl groups, in which "alkyl" or "alk" or "hydrocarbyl" may be linear, branched, or cyclic, each group containing up to thirty carbon atoms, up to sixty halogen atoms, and up to four heteroatoms selected from non-peroxidic O, N, and Si, which may be combined to form functional groups or linkages including ether, alcohol, ketone, aldehyde, carboxylic acid, ester, amide, amino, cyano, anhydride, and the like. Also preferable are polycyclic mono- or diolefins such as norbornene, norbornadiene, and dicyclopentadiene (DCPD), and oligomers thereof, and heteroatoms-containing polycyclic olefins (heterocyclic olefins) such as 7-oxanorbornene, optionally substituted with up to four saturated or unsaturated hydrocarbyl, alkaryl, aralkyl, or aryl groups, in which "alkyl" or "alk" or "hydrocarbyl" may be linear, branched, or cyclic, each group containing up to thirty carbon atoms, up to sixty halogen atoms, and up to four heteroatoms selected from non-peroxidic oxygen (O), nitrogen (N), and silicon (Si), which may be combined to form functional groups or linkages including ether, alcohol, ketone, aldehyde, carboxylic acid, ester, amide, amino, cyano, anhydride, and the like. In the case of substituted norbornene and dicyclopentadiene (DCPD), endo- or exo- or syn- or anti-isomers or combinations of any of these isomers are suitable. Other examples of suitable monomers include 5-methyl-2-norbornene, 5-ethyl-2-norbornene, 7-methyl-2-norbornene, 1-methyl-2-norbornene, 5,6-dimethyl-2-norbornene, 5-ethylidene-2-norbornene, 5-norbornene-2-carbonitrile, 5-norbornene-2-carboxaldehyde, 5-norbornene-2,3-dicarboxylic acid, diethyl 5-norbornene-2,3-dicarboxylate, dimethyl 5-norbornene-2,3-dicarboxylate, 5-norbornene-2,3-dicarboxylic anhydride, 5-norbornene-2,2-dimethanol, 5-norbornene-2-methanol, 5-norbornen-2-ol, 2-acetyl-5-norbornene, 5-norbornen-2-yl acetate, 2-benzoyl-5-norbornene, 5-vinyl-2-norbornene, 5-methylene-2-norbornene, 5-norbornene-2-methanol acrylate, 5-[2-(trimethylsilyl)ethyl]-2-norbornene, 5-[2-(pentamethyldisiloxy)ethyl]-2-norbornene, 5-chloromethyl-2-norbornene, 2,3-di(chloromethyl)-5-norbornene, 5-trifluoromethyl-2-norbornene, and 2,3,3-trifluoro-2-trifluoromethyl-5-norbornene. Preferably, at least one of the cyclic olefins of the present invention is polycyclic, more preferably it is norbornene or substituted norbornene, or dicyclopentadiene or substituted dicyclopentadiene. In embodiments, the unsaturated polyester resin containing at least two strained cycloolefinic double bonds can be blended with an unsubstituted or substituted cycloolefin monomer such as a monocyclic olefin, a bicyclic olefin, a polycyclic olefin, a heterocyclic olefin, and mixtures thereof, the substituents being primarily a hydrocarbon group such as alkyl, cycloalkyl or aryl radicals.

ROMP Catalysts.

The polymerizable thermosetting unsaturated polyester resin further includes a catalyst system for a ring-opening metathesis polymerization (ROMP) or a combination of ROMP and a cationic or free radical polymerization catalyst. The ROMP system can be, for example, a one-component ROMP catalyst system, a two-component ROMP catalyst system, or a multi-component ROMP catalyst system (e.g., as a function of the presence or absence of a cocatalyst and/or other additives such as activators, promoters, stabilizers, side reaction inhibitors, etc.).

As the catalyst for the ring-opening metathesis polymerization, many compounds of the titanium, vanadium, molybdenum, tungsten, rhenium, iridium, ruthenium, and osmium transition metals are suitable and known to persons skilled in the art. There are, for example, complex metal halides, metal carbenes or coordination catalysts of the Ziegler-Natta type. In principle, all these known ROMP catalysts can be used in this invention. The ruthenium and osmium carbene complex is preferably used in this invention since these ROMP catalysts are stable in the presence of a variety of functional groups including hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen.

Generally, the ruthenium or osmium carbene complex catalyst that may be used in the present invention includes a ruthenium or osmium metal center that is in a +2 oxidation state, has an electron count of 16, and is pentacoordinated. These ruthenium or osmium carbene complex catalysts may have the formula:

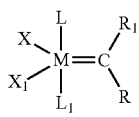

where M is Os or Ru, R and $R^1$ may be the same or different and may be hydrogen or a substituent group which may be $C_2$-$C_{20}$ alkenyl, $C_2$-$C_{20}$ alkynyl, $C_1$-$C_{20}$ alkyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl. Optionally, the substituent group may be substituted with one or more groups selected from $C_1$-$C_5$ alkyl, halide, $C_1$-$C_5$ alkoxy, and phenyl. The phenyl group may optionally be substituted with one or more groups selected from halide, $C_1$-$C_5$ alkyl, and $C_1$-$C_5$ alkoxy. Optionally, the substituent group may be substituted with one or more functional groups selected from hydroxyl, thiol, ketone, aldehyde, ester, ether, amine, imine, amide, nitro, carboxylic acid, disulfide, carbonate, isocyanate, carbodiimide, carboalkoxy, and halogen. In a preferred embodiment, R and $R^1$ are the same or different and may be hydrogen, substituted aryl, unsubstituted aryl, substituted vinyl, and unsubstituted vinyl; where the substituted aryl and substituted vinyl are each substituted with one or more groups selected from hydroxyl, thiol, ketone, aldehyde, ester, ether, amine, imine, amide, nitro, carboxylic acid, disulfide, carbonate, isocyanate, carbodiimide, carboalkoxy, halogen, $C_1$-$C_5$ alkyl, $C_1$-$C_5$ alkoxy, unsubstituted phenyl, and phenyl substituted with a halide, $C_1$-$C_5$ alkyl or $C_1$-$C_5$ alkoxy.

X and $X^1$ may be the same or different and may generally be any anionic ligand. In a preferred embodiment, X and $X^1$ are the same or different and are selected from a halogen, hydrogen or a substituent group selected from $C_1$-$C_{20}$ alkyl, aryl, $C_1$-$C_{20}$ alkoxide, aryloxide, $C_1$-$C_{20}$ alkyldiketonate, aryldiketonate, $C_1$-$C_{20}$ carboxylate, aryl or $C_1$-$C_{20}$ alkylsulfonate, $C_1$-$C_{20}$ alkylthio, $C_1$-$C_{20}$ alkylsulfonyl, and $C_1$-$C_{20}$ alkylsulfinyl. The substituent groups may optionally be substituted with $C_1$-$C_5$ alkyl, halogen, $C_1$-$C_5$ alkoxy or phenyl. The phenyl may be optionally substituted with halogen, $C_1$-$C_5$ alkyl or $C_1$-$C_5$ alkoxy. In a more preferred embodiment, X and $X^1$ are the same or different and may be Cl, Br, I, H or a substituent group selected from benzoate, $C_1$-$C_5$ carboxylate, $C_1$-$C_5$ alkyl, phenoxy, $C_1$-$C_5$ alkoxy, $C_1$-$C_5$ alkylthio, aryl, and $C_1$-$C_5$ alkyl sulfonate. The substituent groups may be optionally substituted with $C_1$-$C_5$ alkyl or a phenyl group. The phenyl group may optionally be substituted with halogen, $C_1$-$C_5$ alkyl or $C_1$-$C_5$ alkoxy. In an even more preferred embodiment, X and $X^1$ are the same or different and are selected from Cl, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, and trifluoromethanesulfonate. In the most preferred embodiment, X and $X^1$ are both Cl.

L and $L^1$ may be the same or different and may generally be any neutral electron donor. In a preferred embodiment, L and $L^1$ may be the same or different and are selected from phosphines, sulfonated phosphines, phosphites, phosphinites, phosphonites, arsines, stibines, ethers, amines, amides, sulfoxides, carboxyls, nitrosyls, pyridines, and thioethers. In a more preferred embodiment, L and $L^1$ are the same or different and are phosphines of the formula $PR^3 R^4 R^5$ where $R^3$ is a secondary alkyl or cycloalkyl and $R^4$ and $R^5$ are the same or different and are aryl, $C_1$-$C_{10}$ primary alkyl, secondary alkyl, or cycloalkyl. In a most preferred embodiment, L and $L^1$ are the same or different and are —P(cyclohexyl)$_3$, —P(cyclopentyl)$_3$, or —P(isopropyl)$_3$. L and $L^1$ may also be —P(phenyl)$_3$.

Preferred catalysts for use in the present invention are those where M is Ru; $R^1$ is hydrogen; R is substituted or unsubstituted aryl or substituted or unsubstituted vinyl; X and $X^1$ are Cl; and L and $L^1$ are triphenylphosphines or tricycloalkylphosphines such as tricyclopentylphosphine and tricyclohexylphosphine. The substituted aryl and substituted vinyl may each be substituted with one or more groups including $C_1$-$C_5$ alkyl, halide, $C_1$-$C_5$ alkoxy, and a phenyl group which may be optionally substituted with one or more halide, $C_1$-$C_5$ alkyl, or $C_1$-$C_5$ alkoxy groups. The substituted aryl and substituted vinyl may also be substituted with one or more functional groups including hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen.

In embodiments, the resin composition can further include a co-catalyst, for example, a cationic initiator or a free radical initiator. In some embodiments, the co-catalyst is a free radical initiator comprising a peroxide, for example, t-butyl peroxide, 2,5-dimethyl-2,5-di-(tert-butylperoxy) hexyne-3, di-tert-butyl peroxide, and 2,5-dimethyl-2,5-di-(tert-butylperoxy) hexane, and mixtures thereof. In embodiments, the co-catalyst is a cationic initiator comprising a one-component Lewis acid catalyst (e.g., inorganic halides such as $AlCl_3$, $AlBr_3$, $BF_3$, $SnCl_4$, $TiCl_4$, $FeCl_3$, $SbCl_5$, $ZnCl_2$, organometallic compounds like $AlEt_2$, $Et_2AlCl$, $EtAlCl_2$, and metallic salts having Lewis acid character), or a two-component (binary) Lewis acid catalyst (e.g., a Lewis acid and a protogenic or cationogenic compound such as water, hydrohalides (HX, X=Cl, Br, I), alkyl halides, alcohols, phenols, organic acids, halohydrins).

Additives.

The thermoset resin molding composition may contain fibers, fillers, reinforcing agents, wetting agents, leveling aids, viscosity modifiers, pigments, or other additives known to the art to adjust or enhance the molding properties (e.g., color effect, spray-ability, sag resistance, mechanical property consistency, etc.).

EXAMPLES

The following examples illustrate the preparation of unsaturated polyesters containing at least two strained cycloolefinic double bonds and curing conditions to make the thermoset polymer according to embodiments of the invention.

Example 1

Preparation of Unsaturated Polyester Resin Containing Cycloolefinic Double Bond 528 grams of maleic anhydride and 760 of grams dicyclopentadiene (DCPD) were added into a two-liter glass flask equipped with stirrer, thermometer, nitrogen introducing tube and condenser. The mixture was heated to about 86° C. 110 grams of water was added by drops and the reaction mixture was heated slowly to 120° C. The reaction was held at 120° C. for 120 minutes. 184 grams of ethylene glycol was added into glass flask. The mixture temperature was raised to 200° C. over 2 to 3 hours. The reaction water was removed from the flask as it was formed. After 6 hours at 200° C., the acid number of the reaction mixture was 37. The reaction of the maleic anhydride, DCPD and ethylene glycol forms an unsaturated polyester with unstrained cycloolefin double bonds (not located on the strained ring). 356 grams of dicyclopentadiene was added by drops at 200° C. over 60 minutes. The reaction mixture was held at 200° C. for 60 minutes after all dicyclopentadiene was added. This second addition of DCPD at 200° C. towards the end of the reaction incorporates strained cycloolefin carbon-carbon double bonds into the polymer chain. The resin mixture was cooled to 120° C. and additional dicyclopentadiene (cycloolefin monomer) at a 1:1 ratio to resin solid was added into the flask to form a resin solution. The resulting unsaturated polyester has a weight average molecular weight of 1500, polydispersity of 4.6, and a glass transition temperature of 23° C.

Example 2

Preparation of Unsaturated Polyester Resin Containing Cycloolefinic Double Bond 492 grams of nadic anhydride and 136 grams of trimethylolpropane were added into a two-liter glass flask equipped with stirrer, thermometer, nitrogen introducing tube and condenser. The mixture was heated to about 140° C., and held at this temperature for 120 minutes. 427 grams of trimethylpentanediol was added into the flask and the reaction mixture was heated to about 190° C. The reaction continued at this temperature for 9 hours and the finished resin had an acid number of 21. The resin mixture was cooled to 120° C. and the dicyclopentadiene at a 1:1 ratio to resin solid was added into the flask to from a resin solution. The resulting unsaturated polyester has a weight average molecular weight of 2400, polydispersity of 3.0, and a glass transition temperature of 16° C.

Examples 3 and 4

Preparation of Cured Resins 50 grams of resin solutions from Example 1 or 2 is poured into a 100 ml flask at the ambient temperature. 0.05 gram of the benzylidene-bis(tricyclohexylphosphine) dichlororuthenium ROMP catalyst is pre-dissolved into 0.45 gram of toluene and added into the resin solution. The resin solution containing catalyst solution is hand mixed for about 1 minute. The resin solutions reach the gel point at about 10.9 and 9.8 minutes. The samples remain at the ambient temperature and the residual cure is checked by DSC. The DSC results of Examples 3 and 4 show a residual exotherm of 19.1 and 19.0 J/g, and glass transition temperatures of 63.0 and 39.7° C.

Examples 5 and 6

Preparation of Cured Resins 40 grams of resin solutions from Example 1 or 2 is poured into a 100 ml flask at an ambient temperature, and 10 grams of 5-ethylidene-2-norbornene is also added into the flask. The resin mixture is well mixed before adding the catalyst. 0.05 gram of the benzylidene-bis(tricyclohexylphosphine) dichlororuthenium ROMP catalyst is pre-dissolved into 0.45 gram of toluene and added into the resin solution. The resin solution containing the catalyst solution is hand mixed for about 1 minute. The resin solutions reached the gel point at the about 3.0 and 2.9 minutes. The samples remain at the ambient temperature and the residual cure is checked by DSC. The DSC results of Examples 5 and 6 show the residual exotherm of 6.8 and 4.8 J/g, and glass transition temperatures of 83.0 and 93.2° C.

Examples 7

Preparation of Cured Resins 40 grams of resin solutions from Example 1 is poured into a 100 ml flask at an ambient temperature, and 10 grams of 5-ethylidene-2-norbornene is also added into the flask. The resin mixture is well mixed before adding the catalyst. 0.5 gram of tin chloride and 0.05 gram of the benzylidene-bis (tricyclohexylphosphine) dichlororuthenium ROMP catalyst pre-dissolved into 0.45 gram of toluene are added into the resin solution. The resin solution containing the catalyst solution is hand mixed for about 1 minute. The resin solutions reached the gel point at the about 2.0 minutes. The samples remain at the ambient temperature and the residual cure is checked by DSC. The DSC results of Examples 7 show the residual exotherm of 8.4 J/g, and glass transition temperatures of 92.0° C.

Examples 8

Preparation of Cured Resins 40 grams of resin solutions from Example 1 is poured into a 100 ml flask at an ambient temperature, and 10 grams of 5-ethylidene-2-norbornene is also added into the flask. The resin mixture is well mixed before adding the catalyst. 0.5 gram of di-tert-butyl peroxide and 0.05 gram of the benzylidene-bis(tricyclohexylphosphine) dichlororuthenium ROMP catalyst pre-dissolved into 0.45 gram of toluene are added into the resin solution. The resin solution containing the catalyst solution is hand mixed for about 1 minute. The resin solutions reached the gel point at the about 2.2 minutes. The samples remain at the ambient temperature and the residual cure is checked by DSC. The DSC results of Examples 8 show the residual exotherm of 4.0 J/g, and glass transition temperatures of 47.7° C.

Example 9

Preparation of Unsaturated Polyester Resin Containing Cycloolefinic Double Bond

An unsaturated polyester polymer containing at least two strained cycloolefinic double bonds can be prepared by combining 410 grams of nadic anhydride, 49 grams of maleic anhydride and 136 grams trimethylolpropane as the initial mixture of Example 2, and then continuing as described.

Example 10

Preparation of Gel Coat

A gel coat was prepared by mixing, respectively, 436 g of resin solution from Example 2, 120 g of titanium dioxide, 30 g of talc and 4 g of fumed silica under high shear.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents. The disclosures of the cited patents, applications, and other references throughout the application are incorporated by reference herein.

What is claimed is:

1. A polymerizable thermosetting unsaturated polyester resin composition containing no styrene monomer, comprising:
   a) an unsaturated polyester polymer containing at least two strained cycloolefinic double bonds, which can be cross-linked through a ring-opening metathesis polymerization (ROMP); and
   b) a catalyst system for the ring-opening metathesis polymerization;
   wherein the unsaturated polyester polymer containing at least two strained cycloolefinic double bonds is the reaction product of a norbornene compound containing functional groups or linkages selected from the group consisting of alcohol, carboxylic acid, ester and anhydride, with a glycol or polyhydric alcohol, and a di- or polycarboxylic acid or anhydride, and has a weight average molecular weight of at least about 1000 and a polydispersity greater than or equal to about 2.

2. The resin composition of claim 1, wherein the unsaturated polyester polymer containing at least two strained cycloolefinic double bonds contains non-cycloolefinic carbon-carbon double bonds.

3. The resin composition of claim 1, wherein the unsaturated polyester polymer contains unstrained cycloolefinic double bonds.

4. The resin composition of claim 1, wherein the unsaturated polyester polymer can be cross-linked through a combination of ROMP and a cationic or free radical polymerization.

5. The resin composition of claim 1, further comprising an unsubstituted or substituted cycloolefin monomer containing unsaturation to reduce viscosity of the resin composition.

6. The resin composition of claim 5, wherein the unsubstituted or substituted cycloolefin monomer is selected from the group of a monocyclic olefin, a bicyclic olefin, a polycyclic olefin, a heterocyclic olefin, and mixtures thereof.

7. The resin composition of claim 1, wherein the ring-opening metathesis polymerization catalyst system is selected from the group consisting of a one-component ROMP catalyst, a two-component ROMP catalyst, or a multi-component ROMP catalyst.

8. The resin composition of claim 1, further comprising a co-catalyst selected from the group consisting of a cationic initiator and a free radical initiator.

9. The resin composition of claim 8, wherein the co-catalyst is a free radical initiator comprising a peroxide selected from the group consisting of t-butyl peroxide, 2,5-dimethyl-2,5-di-(tert-butylperoxy)hexyne-3, di-tert-butyl peroxide, and 2,5-dimethyl-2,5-di-(tert-butylperoxy)hexane, and mixtures thereof.

10. The resin composition of claim 8, wherein the co-catalyst is a cationic initiator comprising a one-component Lewis acid catalyst, or a two-component Lewis acid catalyst.

11. The resin composition of claim 1, further comprising one or more additives selected from the group consisting of fibers, fillers, reinforcing agents, wetting agents, leveling aids, viscosity modifiers and pigments.

12. The resin composition of claim 1, wherein the resin composition is curable at a temperature range of about 20-200° C.

* * * * *